United States Patent [19]
Christensen

[11] Patent Number: 5,252,785
[45] Date of Patent: Oct. 12, 1993

[54] BROAD BAND SEISMIC VIBRATOR
[75] Inventor: Elmo W. Christensen, Tulsa, Okla.
[73] Assignee: Industrial Vehicles International, Tulsa, Okla.
[21] Appl. No.: 817,881
[22] Filed: Jan. 7, 1992
[51] Int. Cl.⁵ .............................................. G01V 1/02
[52] U.S. Cl. .................... 181/113; 181/114; 181/121; 367/189
[58] Field of Search ............... 181/113, 114, 119, 121; 367/189

[56]  References Cited
U.S. PATENT DOCUMENTS

| 4,354,572 | 10/1982 | Martin | 181/116 |
| 4,478,325 | 10/1984 | Dagiel | 192/98 |
| 4,617,838 | 10/1986 | Anderson | 475/195 |
| 4,655,314 | 4/1987 | Airhart | 181/113 |
| 4,662,473 | 5/1987 | Betz | 181/113 |
| 4,712,641 | 12/1987 | Chelminski | 181/113 |
| 4,719,607 | 1/1988 | Airhart | 367/189 |
| 4,787,612 | 11/1988 | Ball et al. | 192/107 R |
| 4,848,512 | 7/1989 | Airhart | 181/114 |
| 4,853,907 | 8/1989 | Bays | 367/189 |
| 4,880,219 | 11/1989 | Nemirovsky | 74/502.3 |
| 4,909,113 | 3/1990 | Ischenko et al. | 83/698 |
| 5,000,285 | 3/1991 | Airhart | 181/113 |

Primary Examiner—J. Woodrow Eldred
Attorney, Agent, or Firm—W. J. Scherback

[57] ABSTRACT

A broad band seismic vibrator includes a hydraulically-operated actuator with a piston shaft depending from the actuator. A spherical member or ball is secured to an end of the shaft and received in a socket provided in an anvil. The spherical member or ball is securely clamped to the end and in its clamped condition affords the sole support for the actuator. Hydraulic means is provided for unclamping the spherical member to enable the positioning of the actuator in selected degrees of inclination from vertical and azimuth.

11 Claims, 4 Drawing Sheets

BROAD BAND SEISMIC VIBRATOR

BACKGROUND OF THE INVENTION

1. Field of the Invention

This invention relates generally to apparatus for imparting seismic vibratory signals to the earth. More particularly, this invention relates to improved apparatus for imparting seismic vibratory signals to the earth along a selected vector path.

2. Description of the Prior Art

The development of multi-component seismic sources has enabled the operators more efficiently to measure sub-surface formation properties such as porosity, fracture orientation, pore fluid type or lithologic type. It is well-known that compressional and shear waves travel with distinct velocities when passing through a particular geologic formation. Changes in formation property, such as rock type, porosity and the like may be detected by changes in the full wave field which includes the compressional and shear wave velocities. By recording the full wave form of a seismic wave, including the compressional and shear waves, one can get far more detailed information concerning rock properties at depth.

A method and apparatus which provides simultaneous compressional and shear waves utilizing but a single vibrating mass is taught in U.S. Pat. No. 4,662,473 issued May 5, 1987. The apparatus described in the patent couples a vibrating mass to a ground engaging base plate so as to enable pivotal rotation of the vibrating mass about two mutually perpendicular rotational axes. In this way, the vibratory axis of the vibrating mass may be made to coincide with any pre-selected vector path. This vector path can then be oriented with respect to a remotely located geophone so as to enable simultaneous generation and detection of compressional and shear waves. The relative amplitudes of such waves are varied by selecting any desired combination of inclination and azimuth for the vibratory axis. The vibrating mass is linked to the base plate by way of a ball and socket joint which constitutes a universal pivot for the vibratory axis of the mass. Mechanical orienting means is provided to orient the vibrating mass along any selected vector path, the ball being freely movable within the socket. The vibratory mass is supported in the selected orientation by the orienting mechanism.

The present invention has a general objective of an apparatus which provides for the generation of simultaneous compressional and shear waves by means of vibrational energy.

A more specific objective of this invention is to provide an improved apparatus for the simultaneous generation of compressional and shear waves wherein the orientation of the apparatus along a selected vector path is devoid of any supplemental mechanical orientation means and the vibrating mass or reactor is locked in place relative to the base plate.

SUMMARY OF THE INVENTION

In accordance with the present invention an apparatus is provided wherein the vibrating mass of a surface seismic source may be adjusted so that its vibratory axis is directed along a slant path of any desired inclination to the vertical combined with any azimuthal orientation with respect to a seismic line between the source and remotely positioned detectors. More particularly, the apparatus comprises a hydraulically-operated actuator including a piston shaft extending from the actuator. A spherical member or ball is secured to an end of the shaft and an anvil receives within a socket at least a portion of the spherical member or ball. The ball or spherical member is securely clamped to the anvil during vibrating operation to maximize coupling. The clamped spherical member or ball affords the sole support for the actuator. A base plate transmits the output from the actuator via the anvil to the surface of the ground. In the illustrated embodiment hydraulic means is utilized for releasing the clamping between the spherical member or ball and the anvil to permit the manual adjustment of the actuator in both azimuth and inclination.

Further objects and advantages of this invention will become apparent from consideration of the following detailed description taken in conjunction with the accompanying drawing.

DETAILED DESCRIPTION OF THE INVENTION

Figure 1:
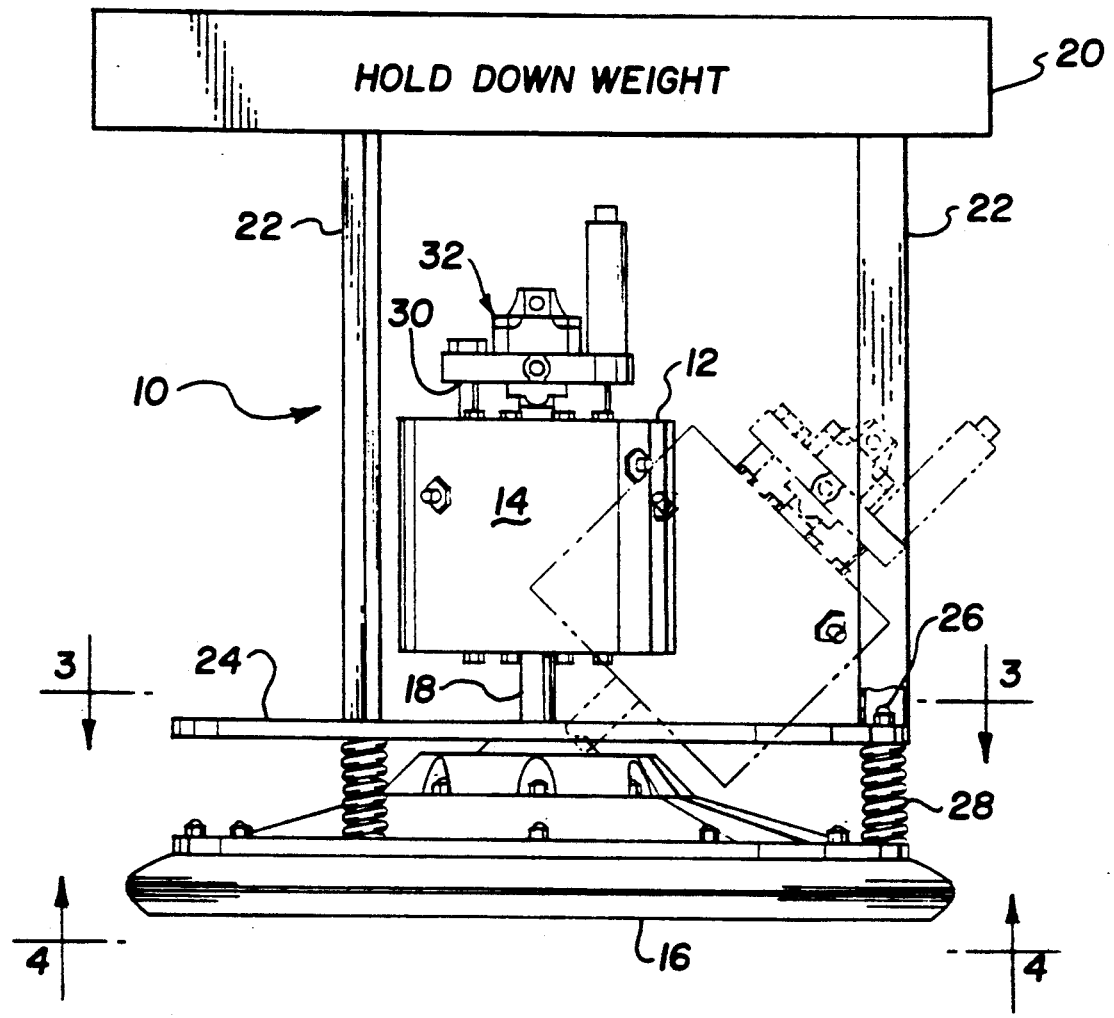
FIG. 1 is a front elevation of apparatus embodying principles of the present invention.

Referring now to FIG. 1 the reference character 10 generally identifies the vibrator of the present invention. Cylindrical vibrator assembly or actuator 12 will be understood to include all of the internal elements (not shown) which form necessary parts of a conventional seismic vibrator. These elements comprise a vibrating mass slidably mounted on a piston which is itself fixed to the housing 14 of the actuator 12. The mass is hydraulically reciprocated through a short stroke at varying frequencies. As the mass moves up and down the reaction forces on the piston are coupled to a base plate 16 by way of piston shaft 18.

As shown, the actuator 12 is solely supported by the shaft 18 and may be pivotally adjusted in inclination, as shown in phantom, with the actuator at approximately a forty-five degree angle to vertical. The actuator 12 can also be adjusted in azimuth.

As is typical with land vibrators a weight is applied to the base plate firmly to couple the base plate 16 to the earth surface. In FIG. 1 a holddown weight 20 is illustrated graphically. This weight is usually provided by applying at least a portion of the weight of the vehicle transporting the vibrator which will also carry the hydraulic supply (not shown). The holddown weight 20 is applied to the base plate 16 by way of posts 22 which may be part of the lift mechanism for the vibrator. The lower ends of the posts are secured in any well-known manner to a foot assembly 24, a plate, which is slidably mounted for vertical movement along bolts 26. Resilient means 28, shown as coil springs, couple the holddown weight 20 to the base plate 16 and provide for isolation between the base plate 16 and the holddown weight 20 permitting the transmission of a constant force or strain to the base plate 16 but preventing the base plate vibration from being transmitted back through the posts 22 to the holddown weight 20.

The output of the hydraulic pump carried by the vehicle is applied by way of suitable conduits, not shown, to ports 30 of servovalve 32. Only one port 30 is shown, the other port is located on the opposite of the servovalve.

Figure 2:
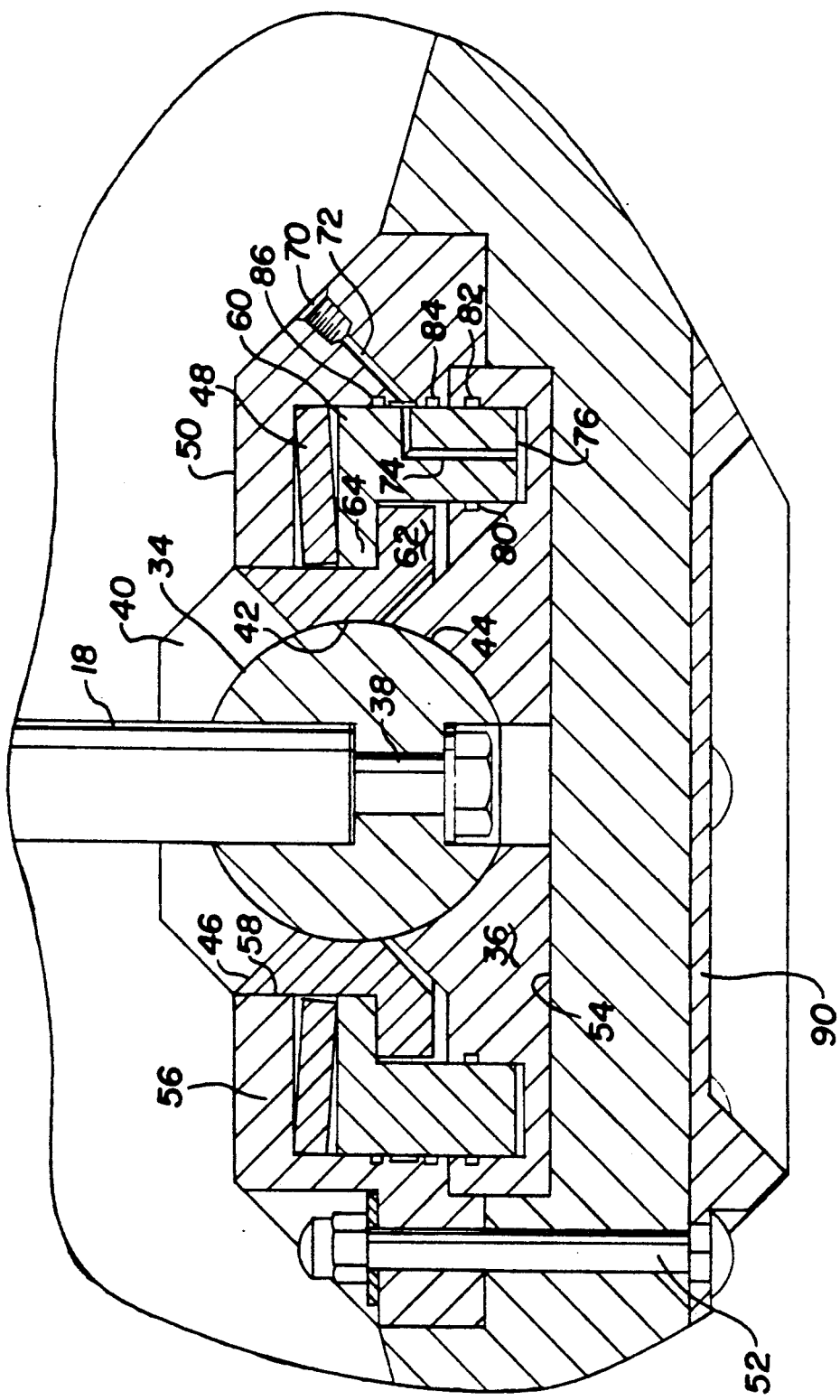
FIG. 2 is an enlarged fragmentary view taken along line 2—2 of FIG. 3. It is a cross-section of the means which clamps the actuator to a vibratory base plate by way of a ball and socket arrangement.

Referring now to FIG. 2, the shaft 18 extending from the actuator 14 is shown coupled to a spherical member or ball 34 nestled in a socket of anvil 36. The shaft 18 is secured to the spherical member of ball 34 by way of machine screw 38.

The spherical member of ball 34 is held or clamped in and to the anvil 36 by structure including a cap assembly 40 having a circular innersurface 42 matching the curvature 44 of the spherical member 34. The cap structure 40 has a cone shape relieved upper portion 46 which, with pressure released from the ball, permits the tilting of the piston shaft 18 to a selected acute angle from vertical. In the illustrated embodiment the selected acute angle may be in the range of from plus forty-five degrees to minus forty-five degrees from vertical. The piston shaft 18 may be rotated fully 360 degrees to any selected azimuthal direction. The ball 34 is clamped or otherwise locked in position by applying a downward force to the cap structure 40. Such force may be applied hydraulically; however, in the embodiment illustrated the force is applied through structure including a Belville spring 48. A retainer 50 is fixed to the base plate 16 by a plurality of bolts 52 and provides a number of functions including the locking of the anvil 36 in the recess 54 formed in the upper portion of the base plate 16. The retainer 50 has an inwardly extending radial segment 56 the innersurface 58 of which engages a vertical surface of the cap structure 40 to guide and otherwise control the vertical movement of the cap structure as it moves from a clamping to an unclamping position and vice versa.

The Belville washer 48 is located in the space provided between the underside of the extending portion 56 of the cap structure 40 and an upper portion of a piston 60. The cap structure 40 has a lower annular shoulder 62 which mates with an inwardly extending shoulder 64 of the piston 60. The Belville washer 48, as shown, exerts a force upward against the retainer 50 and a downward force against the piston 60 which is transmitted via the shoulder 62 of the cap structure to move the cap structure downward and thus lock the spherical member or ball 34 to the anvil 36. When in a locked or latched position, the shaft 18 provides the sole support for the actuator 12 independent of the inclined position or azimuthal position of the actuator 12.

When it is desired to release the ball or spherical member 34 in order to adjust the inclination and azimuth of the actuator 12 hydraulic pressure is applied via port 70 in the retainer 50. The hydraulic pressure or fluid is conducted via channels 72 in the retainer 50 and channel 74 in the piston 60 to an annular channel 76 formed at the base of the piston 60. The application of hydraulic pressure will thus cause the piston 60 to move upward relieving the force exerted by the Belville washer and thus enabling the spherical member or ball 34 to be rotated manually within the socket of the anvil 36. Once a desired inclination and azimuthal position has been acquired for the actuator, the hydraulic pressure is released causing the Belville washer 48 once more to apply force to move the cap structure 40 downward to lock the spherical member or ball 34 in position.

Figure 3:
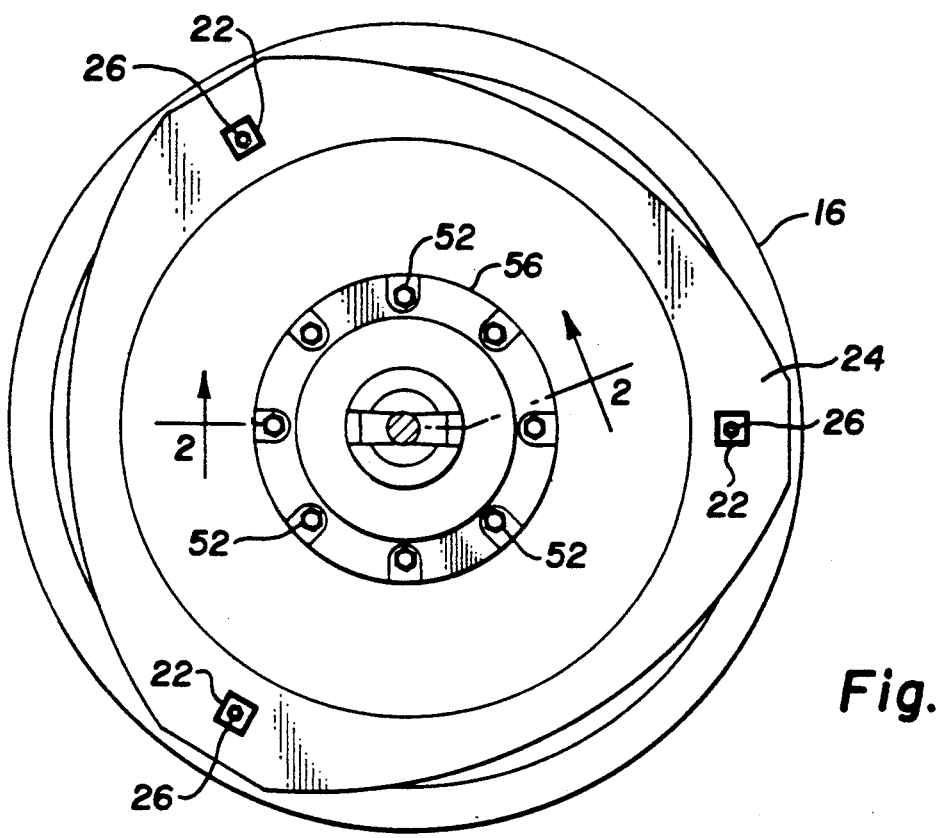
FIG. 3. is a top view of the vibrator taken along line 3—3 of FIG. 1.

O-rings 80, 82, 84 and 86 are provided to prevent leakage of hydraulic fluid about the side portions of the piston 60. An upper view of the structure is illustrated in FIG. 3 where, as shown, three posts 22 are utilized each mounted about the bolts 26. In the prototype constructed eight bolts 52 were utilized to secure the retainer ring 56 to the base.

Figure 4:
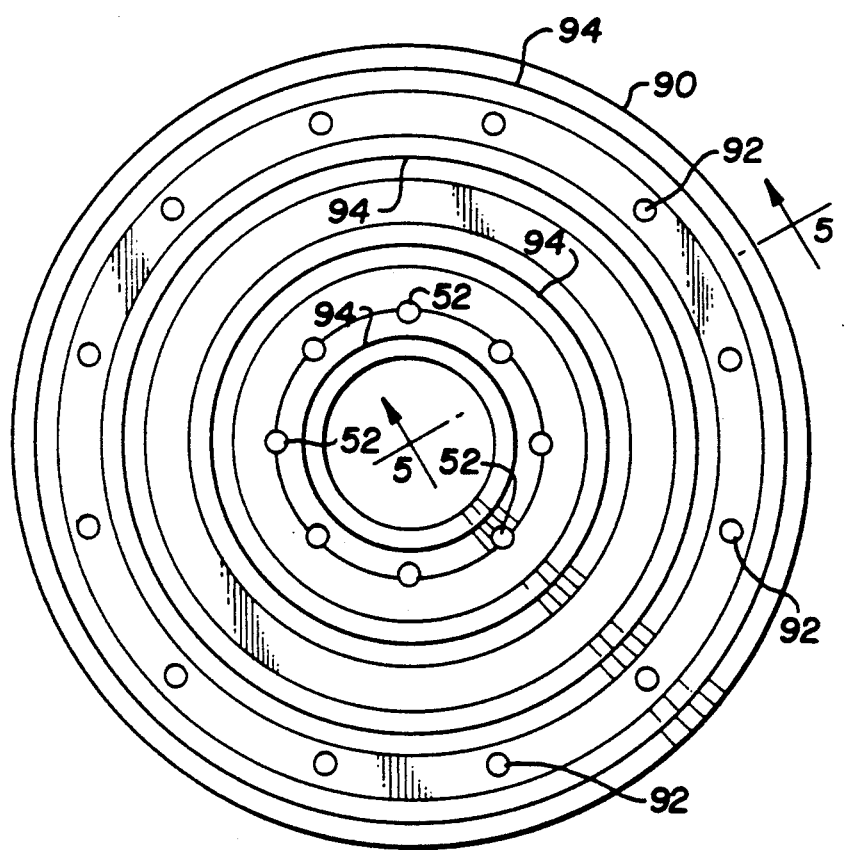
FIG. 4 is a view of the underside of the vibrator taken along line 4—4 of FIG. 1.
Figure 5:
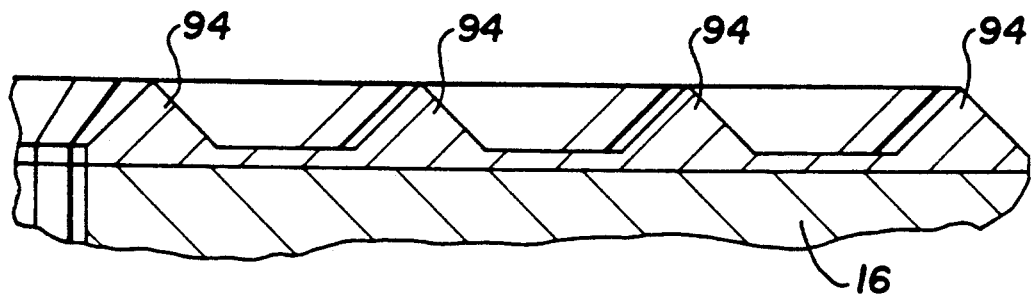
FIG. 5 is a cross-section taken along line 5—5 of FIG. 4 depicting ridges formed in a pad attached to the base plate to prevent movement of the vibrator along the earth's surface during operation.

The underside of the vibrator is illustrated in FIG. 4 where a ground interface plate 90 is shown secured to the base plate 16 by way of a plurality of bolts 92. In the embodiment illustrated, the ground interface plate 90 is provided with a plurality of concentric ridges 94 which are forced into the earth's surface by the holddown weight 20 to provide improved coupling and also to prevent the vibrator from walking or otherwise moving laterally along the earth surface when the vibrator actuator 12 is in other than a vertical position. A cross-section of the ridges 94 is illustrated in FIG. 5. The function provided by the ridges 94 can also be provided by other designs although the design illustrated of concentric ridges is ideally suited where the base plate of the vibrator is circular. Other means may be provided to function in a manner to prevent the lateral movement of the vibrator during operation when generating shear waves. For example, a plurality of spaced pyramid shaped spikes or cleats may be formed on the ground interface plate.

Figure 6:
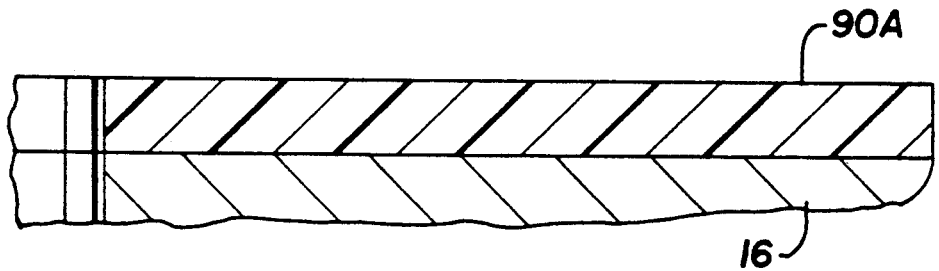
FIG. 6 is a view similar to that of FIG. 5 but illustrating an alternative pad to avoid movement of the vibrator when the vibrator is employed on a hard surface such as a roadway.

In a prototype of the invention the base plate 16 was of circular configuration with a diameter of approximately 36 inches. The servovalve 32 was a 5 gpm, 2 stage valve. The prototype delivered 1,000 pounds of output over a frequency range of 10 to 550 hertz. The relatively light weight of the vibrator enabled transport by pickup truck and its broad band frequency output makes it ideally suited for but not limited to shallow exploration for engineering purposes.

Where the vibrator is to be utilized on a hard surface such as a roadway the ground interface plate will take the form shown in FIG. 6 where the plate 90A is formed of polyurethane or other suitable plastic bonded onto a surface of the base plate 16.

Now that the invention has been described in detail, modifications will occur to those skilled in the art and is intended to cover such modifications that fall within the scope of the appended claims.

What is claimed is:

1. A broad band seismic vibrator for exploration of a subsurface comprising:
   a. a hydraulically operated actuator including a piston shaft depending from said actuator,
   b. a spherical member secured to an end of said shaft,
   c. an anvil for receiving at least a portion of said spherical member,
   d. means for securely clamping said spherical member to said anvil whereby said clamped spherical member affords the sole support for said actuator,
   e. a base plate for transmitting the output from said actuator via said spherical member and said anvil to a ground surface, and f. fluid means for releasing said clamping between said spherical member and said anvil to permit manual adjustment to the position of said actuator in both azimuth and inclination.

2. The seismic vibrator of claim includes means fastened to the bottom surface of said base plate for reducing lateral movement of said vibrator during operation.

3. The seismic vibrator of claim 2 in which said base plate is of circular configuration.

4. The seismic vibrator of claim 2 in which said base plate is of circular configuration and said means for reducing lateral movement is comprised of a series of spaced concentrically arranged rings of protuberances.

5. The seismic vibrator of claim 1 in which said means for securely clamping said spherical member includes a Belville spring.

6. The seismic vibrator of claim 1 wherein said means for securely clamping said spherical member to said anvil includes a cap structure having a circular inner surface matching the curvature of said spherical member and a cone-shaped relieved upper portion to permit tilting of said piston shaft at an acute angle from vertical.

7. The seismic vibrator of claim 1 in which said fluid means for releasing the clamping includes means for conducting hydraulic pressures to counteract the force applied by said clamping means.

8. The seismic vibrator of claim 1 including retainer means for holding said anvil in place.

9. The seismic vibrator of claim 6 in which the acute angle is in the range of from plus forty-five degrees to minus forty-five degrees from vertical.

10. The seismic vibrator of claim 6 including a piston surrounding said cap structure and having an inwardly extending annular shoulder, said cap structure including an outwardly extending annular shoulder for engagement with said inwardly extending annular shoulder for transmitting clamping pressure to said spherical member by way of said piston, and means for applying hydraulic pressure to said piston to relieve said clamping pressure to enable adjustment of said activator in both azimuth and inclination.

11. The seismic vibrator of claim 9 including retainer means for holding said anvil in place and a Belville spring disposed between said retainer means and an upper surface of said piston for applying clamping pressure to said cap structure.

* * * * *